United States Patent Office 3,551,345
Patented Dec. 29, 1970

3,551,345
CHELATED LANTHANIDE COMPOSITIONS
Marcos Y. Kleinerman, Southbridge, Mass., assignor, by mesne assignments, to American Optical Corporation, Southbridge, Mass., a corporation of Delaware
No Drawing. Continuation of application Ser. No. 364,022, Apr. 30, 1964. This application May 24, 1967, Ser. No. 640,810
The portion of the term of the patent subsequent to Jan. 14, 1986, has been disclaimed
Int. Cl. C09k 1/02
U.S. Cl. 252—301.2  4 Claims

ABSTRACT OF THE DISCLOSURE

A composition of Lewis bases with lanthanide chelates, either alone or in a solvent or other carrier, for substantially enhancing the fluorescence properties of the chelates. Such compositions provide strong fluorescence at room temperature for those chelates known to have poor fluorescence properties at such temperatures.

CROSS-REFERENCE TO A RELATED APPLICATION

This application is a continuation of aplication Ser. No. 364,022, filed Apr. 30, 1964, now abandoned.

BACKGROUND OF THE INVENTION

This invention relates to lanthanide-containing compositions. More particularly, this invention relates to compositions containing a chelated lanthanide. Still more particularly, this invention relates to compositions, liquid and/or solid, containing chelated lanthanide ions together with another material admixed therewith.

It is known that certain chelated lanthanide ions, such as the trivalent rare earth ions terbium, europium and samarium, exhibit fluorescence and that this property of such elements renders compounds of these elements of commercial interest, particularly in the field of laser applications and development and the like. In other applications, such as in paints or surface coatings and the like, this property of fluorescence is also useful and of interest.

SUMMARY

It is an object of this invention to provide novel lanthanide-containing compositions.

Another object of this invention is to provide novel chelated lanthanide ion-containing compositions.

Still another object of this invention is to provide chelated lanthanide ion-containing compositions having improved fluorescence.

Yet another object of this invention in accordance with one embodiment thereof is to provide a method for improving or enhancing the fluorescence of fluorescing chelated lanthanide ion-containing compositions.

How these and other objects of this invention are accomplished will become apparent in the light of the accompanying disclosure. In at least one embodiment of the practice of this invention at least one of the foregoing objects will be achieved.

In accordance with this invention novel and useful lanthanide-containing compositions are provided by incorporating in said lanthanide-containing compositions a Lewis base. A Lewis base may be defined as a compound which can donate an electron pair. A Lewis base may also be defined as a compound having an unshared electron pair. Of particular interest in the practice of this invention are those Lewis bases which are non-chelating with respect to the lanthanide ion in the compositions in which the Lewis base is incorporated. Those lanthanides or lanthanide ions which are useful in the practice of this invention include samarium, europium, terbium and dysprosium.

Examples of Lewis bases which are useful in the practice of this invention include dimethylsulfoxide, tri-n-butylphosphate, pyridine, piperidine, 1,8 p-menthane-diamine, diglycidyl ether of Bisphenol A (Dow Epoxy Resin 332) cured with 1,8 p-menthanediamine, triethylamine, tetramethylguanidine, tetramethylammonium hydroxide, triethylenediamine, diethylenetriamine, triethylene tetramine, meta-xylylene diamine, 1,3 butanediamine, tri-n-octylphosphine oxide, tri-n-butylphosphine oxide, morpholine and 2,4 dimethylmorpholine. Other Lewis bases are known and are useful in the practice of this invention. Of the Lewis bases, the amines, i.e. those organic compounds which can be considered as derived from ammonia by replacement of one or more of the hydrogen atoms with an organic radical, are particularly useful in the practice of this invention.

Specific chelated lanthanide ions which may be incorporated together with a Lewis base in compositions in accordance with this invention, which compositions may also contain a liquid and/or solid carrier for the lanthanide ions and the Lewis base, include europium tris-benzoylacetate, terbium tris-dibenzoylamine, europium tris-dibenzoylamine, europium tris-dibenzoylmethide, europium tris-thenoyltrifluoroacetonate, samarium tris-thenoyltrifluoroacetonate, and the other chelates listed in Table I.

DESCRIPTION OF PREFERRED EMBODIMENTS

In accordance with one embodiment of this invention, the enhancement of fluorescence exhibited by certain chelated lanthanide ions, such as trivalent terbium and trivalent europium, it has been observed that the fluorescence of europium tris-thenoyltrifluoroacetonate is greatly enhancd in the presence of a Lewis base, such as tri-n-butylphosphate, the tri-alkylphosphine oxides dimethylsulfoxide and the Lewis base amines. This enhancement of fluorescence has also been observed in europium tris-dibenzoylmethide when admixed with Lewis base amines, dimethylsulfoxide, and tri-n-butylphosphate, also europium tris-thenoyltrifluoroacetonate when admixed with a Lewis base, such as a Lewis base amine, dimethylsulfoxide and tri-n-butylphosphate, and also in europium tribenzoylacetonate when admixed with a Lewis base, such as a Lewis base amine, dimethylsulfoxide and tri-n-butylphosphate.

Set forth in accompanying Table I are chelated lanthanide ion-containing compositions in accordance with this invention. Those compositions which exhibit enhanced fluorescence are indicated by the letter X, and those compositions which either do not exhibit substantially enhanced fluorescence, or on which there are no data available, are indicated by the letter O.

TABLE I.—CHELATES

| Lewis base | Europium | | | | Terbium | Samarium | | Dysprosium |
|---|---|---|---|---|---|---|---|---|
| | I | II | III | IV | V | VI | VII | VIII |
| A | X | X | X | X | X | X | X | X |
| B | X | X | X | X | X | X | X | X |
| C | X | O | X | X | X | O | O | O |
| D | X | O | X | X | X | O | O | O |
| E | X | X | X | X | X | O | O | O |
| F | X | X | X | X | X | O | O | O |
| G | O | O | X | X | O | O | O | O |
| H | X | O | X | X | O | O | O | O |
| I | X | O | X | X | O | O | O | O |
| J | X | O | X | X | O | O | O | O |
| K | X | O | X | X | O | O | O | O |
| L | O | O | X | X | O | O | O | O |
| M | X | O | X | X | O | O | O | O |
| N | X | O | X | X | O | O | O | O |
| O | X | X | X | X | O | O | O | O |
| P | X | O | X | X | O | O | O | O |
| Q | X | O | X | X | O | X | X | X |
| R | X | O | X | X | O | X | O | O |

NOTE:
I=Europium tris-benzoylacetonate.
II=Europium tris-dibenzoylamine.
III=Europium tris-dibenzoylmethide.
IV=Europium tris-thenoyltrifluoroacetonate.
V=Terbium tris-dibenzoylamine.
VI=Samarium tris-dibenzoylamine.
VII=Samarium tris-thenoyltrifluoroacetonate.
VIII=Dysprosium trisdibenzoylamine.

Lewis bases
A Dimethylsulfoxide
B Tri-n-butylphosphate
C Pyridine
D Piperidine
E 1,8-p-menthanediamine
F Digylcidyl ether of Bisphenol A (Dow Epoxy Resin 332) cured with 1,8-p-menthanediamine
G Triethylamine
H Tetramethylguanidine
I Tetramethylammonium hydroxide
J Triethylenediamine
K Diethylenetriamine
L Triethylene tetramine
M Meta-xylylene diamine
N 1,3-butanediamine
O Tri-n-octylphosphine oxide
P Tri-n-butylphosphine oxide
Q Morpholine In the preparation of chelated lanthanide ion-Lewis base compositions in accordance with this invention, the admixture of chelated lanthanide ion and Lewis base may be present in a mutual solvent. Also, in the practice of this invention, it is preferred, particularly when it is desired to enhance the fluorescence of the chelated lanthanide ion, that the solvent which may be employed for the Lewis base and the chelated lanthanide ion, does not react with the Lewis base associated therewith. The Lewis base itself usefully serves as a solvent for the chelated lanthanide ion, in which instance the presence of an additional or auxiliary solvent, a mutual solvent for both the chelated lanthanide ion and the Lewis base, is not necessary.

Suitable solvents, in addition to the Lewis bases, include the well known organic solvents, such as the various alkanols, e.g. methanol, ethanol, propyl alcohol, butyl alcohol, isopropyl alcohol, and the various cycloalkanols, such as cyclohexanol, the various ketones, such as acetone, methyl ethyl ketone, diethyl ketone, methyl propylketone, methyl butyl ketone, methyl isobutyl ketone, as well as cyclohexanone. The various ethers liquid at room temperature are also useful as solvents, including ethyl ether, propyl ether, ethyl propyl ether and the like, also, the various esters, particularly the esters prepared by reacting the lower molecular weight alkanols in the range $C_1$–$C_8$, with the lower molecular weight aliphatic acids in the range $C_1$–$C_8$, and mixtures of solvents including petroleum solvents, such as petroleum ether, are also useful.

In addition to a liquid carrier or solvent for the chelated lanthanide ion-Lewis base compositions of this invention, the carriers or support for these compositions may comprise solid materials of a plastic and/or glassy nature.

The fluorescence of compositions in accordance with this invention is observable under irradiation in the ultraviolet range. When compositions of this invention are used in paints and surface coatings pulse excitation is not normally used, and continuous wave excitation is also a useful indicium of fluorescent behavior under pulse excitation for laser application. When solutions containing a chelated lanthanide ion and a Lewis base were excited at room temperature, such as solutions of terbium tris-dibenzoylamine, dysprosium tris-dibenzoylamine, samarium tris-thenoyltrifluoroacetonate and europium tris-thenoyltrifluoroacetonate, fluorescence was observed. Chelated europium fluoresces in the visible spectrum with a red-orange color and chelated terbium fluoresces in the visible spectrum with a blue-green color. The compositions in accordance with this invention may contain a concentration of chelated lanthanide ion, such as chelated europium or chelated terbium ions, or mixtures thereof, from about $1 \times 10^{-4}$ M chelated lanthanide up to about .5 M, such as in the range $5 \times 10^{-3}$ M to .1 M chelated lanthanide. The amount of Lewis base employed in the compositions of this invention, particularly when enhanced fluorescence is desired, should be at least the molar equivalent of the chelated lanthanide ion therein. A smaller amount, however, of Lewis base may be present and still produce satisfactory and useful compositions.

As will be apparent to those skilled in the art in the light of the foregoing disclosure many substitutions and modifications are possible in the practice of this invention without departing from the spirit or scope thereof.

I claim:
1. A fluorescent composition consisting essentially of an europium chelate of dibenzoylamine together with a Lewis base selected from the group consisting of dimethylsulfoxide, tri-n-butylphosphate, 1,8-p-menthanediamine, diglycidyl ether of Bisphenol A cured with 1,8-p-methanediamine, tri-n-octylphosphine oxide.

2. A fluorescent composition consisting essentially of a terbium chelate of dibenzoylamine together with a Lewis base selected from the group consisting of dimethylsulfoxide, tri-n-butylphosphate, piperidine, 1,8-p-menthanediamine, diglycidyl ether of Bisphenol A cured with 1,8-p-methanediamine.

3. A fluorescent composition consisting essentially of a samarium chelate of dibenzoylamine together with a Lewis base selected from the group consisting of dimethylsulfoxide, tri-n-butylphosphate, morpholine, and 2,6-dimethylmorpholine.

4. A fluorescent composition consisting essentially of a dysprosium chelate of dibenzoylamine together with a Lewis base selected from the group consisting of dimethylsulfoxide, tri-n-butylphosphate and morpholine.

References Cited

UNITED STATES PATENTS

| 3,377,292 | 4/1968 | Halverson | 252—301.3 |
| 3,225,307 | 12/1965 | Weissman | 252—301.3 |

FOREIGN PATENTS

| 1,344,970 | 10/1963 | France | 331—94.5 |
| 1,345,477 | 10/1963 | France | 331—94.5 |

OTHER REFERENCES

Ohlmann et al.—Fluorescence Properties of Europium Dibenzoylmethide and Its Complexes with Lewis Bases, Journal of Chemical Physics, May 15, 1964, vol. 40, No. 10, pp. 3131–3133. Copy in Scientific Library.

Crosby et al.—Spectroscopic Studies of Rare Earth Chelates—Journal of Physical Chemistry, vol. 66, No. 12, December 1962, pp. 2493–99. Copy in Scientific Library.

TOBIAS E. LEVOW, Primary Examiner

R. D. EDMONDS, Assistant Examiner